US006879161B2

(12) United States Patent
Rowan

(10) Patent No.: US 6,879,161 B2
(45) Date of Patent: Apr. 12, 2005

(54) METHOD AND APPARATUS FOR DISTINGUISHING METAL OBJECTS EMPLOYING MULTIPLE FREQUENCY INTERROGATION

(75) Inventor: Mark D. Rowan, Lebanon, OR (US)

(73) Assignee: White's Electronics, Inc., Sweet Home, OR (US)

( * ) Notice: Subject to any disclaimer, the term of this patent is extended or adjusted under 35 U.S.C. 154(b) by 230 days.

(21) Appl. No.: 10/074,349

(22) Filed: Feb. 11, 2002

(65) Prior Publication Data

US 2002/0093338 A1 Jul. 18, 2002

(51) Int. Cl.[7] ............................................. G01V 3/08
(52) U.S. Cl. ..................................................... 324/329
(58) Field of Search ............................... 324/228–243, 324/326–329; 340/551, 870.26

(56) References Cited

U.S. PATENT DOCUMENTS

| 3,686,564 | A | | 8/1972 | Mallick, Jr et al. |
| 3,986,104 | A | | 10/1976 | Randolph, Jr. |
| 4,237,419 | A | * | 12/1980 | Tornblom et al. ........... 324/225 |
| 4,300,097 | A | | 11/1981 | Turner |
| 4,321,539 | A | * | 3/1982 | Trump ........................ 324/328 |
| 4,439,734 | A | | 3/1984 | Weber |
| 4,486,712 | A | | 12/1984 | Weber |
| 4,486,713 | A | | 12/1984 | Gifford |
| 4,507,612 | A | * | 3/1985 | Payne ......................... 324/329 |
| 4,678,992 | A | | 7/1987 | Hametta |
| 4,853,617 | A | | 8/1989 | Douglas et al. |
| 4,890,064 | A | * | 12/1989 | Candy ......................... 324/329 |
| 4,894,618 | A | | 1/1990 | Candy |
| 4,942,360 | A | * | 7/1990 | Candy ......................... 324/329 |
| 4,992,741 | A | | 2/1991 | Douglas et al. |
| 5,028,870 | A | | 7/1991 | Reed |
| 5,047,718 | A | | 9/1991 | Aittoniemi et al. |
| 5,365,169 | A | | 11/1994 | Hosohara et al. |
| 5,405,143 | A | | 4/1995 | Takemoto et al. |
| 5,506,506 | A | | 4/1996 | Candy |
| 5,521,583 | A | | 5/1996 | Frahm et al. |
| 5,523,739 | A | | 6/1996 | Manneschi |
| 5,576,624 | A | | 11/1996 | Candy |
| 5,642,050 | A | | 6/1997 | Shoemaker |
| 5,680,048 | A | | 10/1997 | Wollny |
| 5,680,103 | A | | 10/1997 | Turner et al. |
| 5,721,489 | A | | 2/1998 | Weaver et al. |
| 5,729,143 | A | | 3/1998 | Tavernetti et al. |
| 5,777,478 | A | | 7/1998 | Jackson |
| 5,786,696 | A | | 7/1998 | Weaver et al. |
| 5,959,451 | A | | 9/1999 | De Torfino |
| 5,963,035 | A | | 10/1999 | Won |
| 6,087,833 | A | | 7/2000 | Jackson |
| 6,104,193 | A | | 8/2000 | Bell |
| 6,286,370 | B1 | | 9/2001 | Sinha |
| 6,421,621 | B1 | * | 7/2002 | Earle ............................ 702/72 |

\* cited by examiner

*Primary Examiner*—N. Le
*Assistant Examiner*—Reena Aurora
(74) *Attorney, Agent, or Firm*—Birdwell & Janke, LLP

(57) ABSTRACT

A method and apparatus for distinguishing metal objects employing multiple frequency interrogation. In one aspect, the method includes interrogating a target with at least two frequencies, obtaining respective response signals for the two frequencies, resolving the response signals into at least respective resistive component portions, comparing the magnitudes of at least two of the resistive component portions, selecting one response signal from among the response signals based on the comparison, and characterizing the target with the selected response signal. In other aspects, the method includes obtaining response data by interrogating the target at at least two frequencies, normalizing the response data and comparing the normalized response data. A signal is provided indicating the extent of any disagreement in the normalized response data.

11 Claims, 3 Drawing Sheets

METHOD AND APPARATUS FOR DISTINGUISHING METAL OBJECTS EMPLOYING MULTIPLE FREQUENCY INTERROGATION

FIELD OF THE INVENTION

The present invention relates to a method and apparatus for distinguishing metal objects employing multiple frequency interrogation. More particularly, the invention relates to a hobbyist-type metal detector employing dual frequency interrogation for this purpose.

BACKGROUND OF THE INVENTION

Metal detectors are popularly used by hobbyists and collectors to search for buried or otherwise hidden metal objects of value or particular interest, such as coins, jewelry, and artifacts of historical significance. Metal detectors typically employ a time-varying electromagnetic field to "interrogate" a target volume of ground, proximate the detector, that may contain such objects. A metal object in the ground receives electromagnetic energy from the field and responds by modifying the field according to the electric and magnetic properties and quantities of the materials of which the object is composed. By consulting a look-up table of the responses that would be expected from various types of objects, a response can be used to characterize or identify, as well as detect, the object.

In addition to valuable metal objects of interest, the ground often contains a substantial background of relatively valueless objects such as soft drink cans and pull-tabs, and the ground itself is often composed of metallic compounds, particularly compounds containing iron. This background also responds to the interrogating field, and it is therefore necessary for the detector to be able to distinguish between objects of interest and the background. As would be expected, it is always highly desirable to improve the detector's capabilities in this regard.

Traditionally, metal detectors have employed a single interrogating frequency. Electromagnetic radiation at the selected interrogating frequency is broadcast or directed to a target volume of ground. The detector measures a response which is an electromagnetic signal which has a magnitude and phase that are in general altered from the magnitude and phase of the original radiation as a result of the (complex) impedance of the target.

The impedance of the target has a real part that produces a (vector) component of the response that is in-phase with the interrogating frequency, and a so-called imaginary part that produces another component of the response that is in-quadrature, or 90 degrees out of phase with the interrogation frequency. It may be noted that the real component of a vector is often identified in engineering and mathematics with the horizontal "x" axis of a standard Cartesian coordinate system, while the imaginary component is identified with the vertical "y" axis. However, in the metal detector art, metal detector responses are sometimes graphed so that the real part of the response is plotted on a vertical "Y" axis that represents zero phase shift, with a horizontal "X" axis depicting negative and positive phase deviations from the "Y" axis. This scheme is used herein.

The real, or "Y" component of a given frequency specific response vector represents the effect of the conductivity of all of the material contributing to the response at the specific frequency, while the imaginary, or "X" component represents the effect at the frequency of the reactance of this material. For non-ferrous metal materials and saltwater, the resistive component of the response will be much greater than the reactive component; conversely, for ferrous metals and soil containing iron, the reactive component is larger than the resistive component. The detector resolves the total frequency specific response into its Y and X components, each providing information about the target volume of ground that can be used to advantage in discriminating between objects in the ground and the background.

More recently, metal detectors have been provided that employ two interrogating frequencies, so that four response components may be obtained as described above. A lower frequency is provided that is particularly suited for detecting larger objects, especially those of good conductors like copper or silver, and a higher frequency is provided that is more suited for detecting smaller objects and objects that are composed of metals which are relatively poor conductors. The user of such a detector may select between the two frequencies depending on the type of object that the user is searching for.

To subtract out the effect of the ground on the response, metal detectors typically provide a feature known as "ground balancing." In single frequency detectors, ground balancing is conventionally achieved by selecting a location on the ground for calibrating the detector, and determining how to linearly combine the X and Y components of the response so that the response is zero, or put another way, how much to rotate the X and Y coordinate system so that, at the phase angle of the ground, the response is nulled. In practice, this can be achieved by varying the phase angles of respective synchronous demodulators so that the demodulators are insensitive to components with a phase equal to the phase angle of the ground.

Similarly, for dual frequency detectors, Candy, U.S. Pat. No. 4,942,360, proposes ground balancing by forming various linear combinations of the four X and Y components. For example, to null the response for reactive soil, the '360 Patent proposes among other things forming a linear combination of the reactive components for the two frequencies.

In summary, dual frequencies have been used, as explained above, to permit arbitrary selection between the frequencies in order to tailor the frequency to an anticipated object, and the response components for the two frequencies have also been used in combination to effect ground balancing. However, metal detectors have heretofore not made full use of the information present in the response as a result of interrogating a target volume of ground with multiple frequencies. Particularly, prior art metal detectors have not employed the full benefit of the information present in a multiple frequency response to improve the capability of the detector to distinguish between metal objects. Accordingly, there is a need for a method and apparatus for distinguishing metal objects employing multiple frequency interrogation that provides for improving the capabilities of a metal detector in this important regard.

SUMMARY OF THE INVENTION

A method and apparatus for distinguishing metal objects employing multiple frequency interrogation of the present invention meets the aforementioned need, in one aspect of the invention, by interrogating a target with at least two frequencies, obtaining respective response signals for the frequencies, resolving the response signals into at least respective resistive component portions, comparing the magnitudes of at least two of the resistive component portions, selecting one response signal from among the response signals based on the comparison, and characterizing the target with the selected response signal.

In a correlating aspect of the invention, response data obtained by interrogating the target at at least two frequencies are normalized and a comparison is made between the normalized data. A signal is provided indicating the extent of any disagreement.

Therefore, it is an object of the present invention to provide a novel and improved method and apparatus for distinguishing metal objects employing multiple frequency interrogation.

It is another object of the present invention to provide such a method and apparatus that provides for employing the full benefit of the information present in a multiple frequency response to improve the capability of the detector to distinguish between metal targets.

The foregoing and other objects, features and advantages of the present invention will be more readily understood upon consideration of the following detailed description of the invention, taken in conjunction with the following drawings.

DETAILED DESCRIPTION OF A PREFERRED EMBODIMENT

As mentioned above, dual frequency interrogation has been known in the art, but full advantage of the information gained thereby has not been taken. Methods and apparatus according to the invention for distinguishing metal objects employing multiple frequency interrogation make use of both the information contained in a metal detector's response at one frequency and the additional information contained in the detector's response at at least one other frequency. The increased use of available information essentially increases the resolution of the detector, i.e., its ability to resolve or discriminate between different types of metal objects. It is noted at the outset that while preferred embodiments of the invention are described in the context of dual frequencies, it is understood that the principles of the invention are equally applicable to metal detectors employing any number of frequencies for interrogation.

Figure 1:
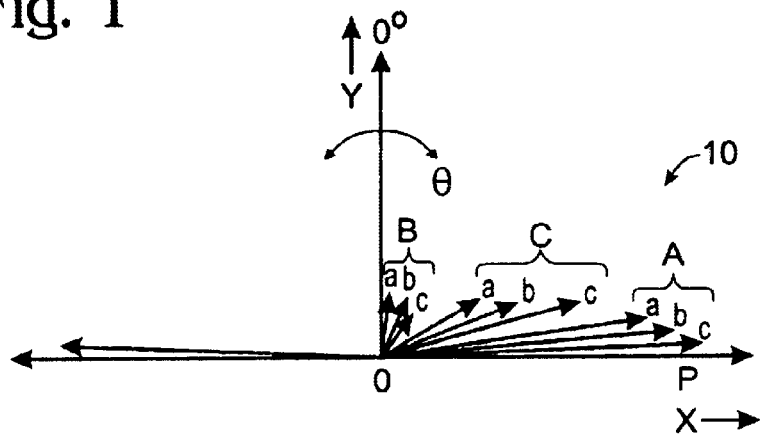
FIG. 1 is a graph illustrating metal detector response signals for various materials, providing a basis for discussing a first aspect of a method and apparatus for distinguishing metal objects employing multiple frequency interrogation according to the present invention.

FIG. 1 provides a basis for considering a first aspect of the invention. The Figure shows a number of vectors 10 in an X-Y coordinate system. Generally, the vectors have a magnitude (denoted by their lengths) and a phase (denoted by a phase angle θ), and represent time-varying electrical or electromagnetic signals at single, specific frequencies. As explained above, the X axis defines a range (positive to the left and negative to the right) for phase deviations from a vertical axis Y; the axis Y defines a positive range for the real or resistive part of the vectors. The X axis therefore defines a positive and negative range for the imaginary or reactive part of the vectors.

More specifically, the vectors 10 in FIG. 1 are a metal detector's frequency specific responses to interrogation at three different frequencies "A", "B," and "C," to three different metal objects "a," "b," and "c." Frequency "A" is a relatively high frequency and frequency "B" is a relatively low frequency, with frequency "C" being an intermediate frequency. These response vectors 10 are further resolvable into resistive and reactive component portions as discussed above. The resistive component portion of a given vector 10 may be obtained by multiplying the magnitude of the vector by the cosine of its phase angle θ, and the reactive component portion of the given vector may be obtained by multiplying the magnitude of the vector by the sine of its phase angle.

In conjunction with the development of FIG. 1, the present inventors recognized that if the interrogation frequency is too high, e.g., at Frequency "A," the phase shift from most nonferrous metal objects will approach 180 degrees. This "crowds" the responses 10 together at a positive portion "P" of the X axis as shown. Conversely, if the interrogation frequency is too low, e.g., at Frequency "B", the magnitude of the eddy currents in many metal objects will be too small to produce a detectable response, which "crowds" the responses toward the origin "O" of the graph as shown. However, at the intermediate frequency "C," the response vectors are spaced apart maximally with respect to the X axis, so that the differences between the responses for the three metals are made more apparent. The selection of frequency "C" over the alternatives "A" and "B" therefore provides directly for enhanced detector resolution.

Figure 2:
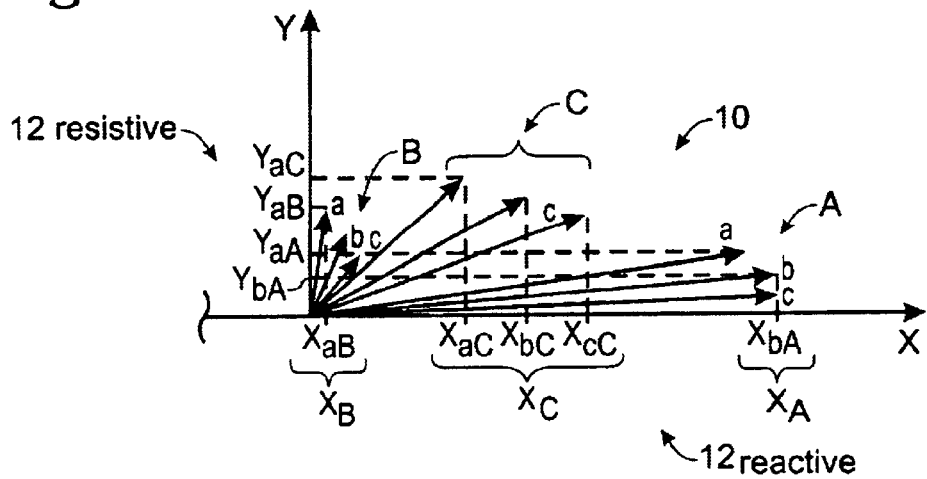
FIG. 2 is a graph showing a portion of the graph of FIG. 1 in greater detail.

Turning to FIG. 2, which shows a selected portion of FIG. 1 in greater detail, some representative frequency specific components 12 of the response vectors 10 are identified to further explicate the aforementioned concept. The frequency specific components 12 comprise frequency specific resistive portions $12_{reactive}$ and frequency specific reactive portions $12_{reactive}$, into which the vectors 10 are resolved by the coordinate system X-Y. For example, for the high frequency "A," the response vector 10 for the metal "b" is resolved into two frequency specific response component portions, namely a reactive response component portion $X_{bA}$ and a resistive response component portion $Y_{bA}$. Similarly, for the low frequency "B," the response vector for the metal "a" is resolved into the response component portions $X_{aB}$ and $Y_{aB}$. A range $X_C$ for the reactive component portions for the three metal objects "a," "b," and "c" specific to the intermediate frequency C is shown that extends from the reactive component portion $X_{aC}$ for the metal "a" at frequency "C" to the reactive component portion $X_{cC}$ for the metal "c" at frequency "C."

By inspection of FIG. 2, it is apparent that the range $X_C$ is much larger than the analogously defined ranges $X_A$ and $X_B$, and the resolution of the detector when using frequency "C" for interrogation will be commensurately increased with respect to the alternative frequencies "A" and "B."

In a dual frequency metal detector, it will often not be known in advance which of two freuencies, e.g., "A" or "C" will provide optimum resolution for discriminating between the metal objects that happen to be in a given target volume of ground. Thence, multiple frequencies can be used to interrogate the target and the optimum frequency identified and selected either by the user or by the detector. It can be readily appreciated that a number of different algorithms can be used for this purpose in consideration of FIG. 2. For example, frequency "C" can be identified as preferable to frequencies "A" and "B" for discriminating between the metal objects "a," "b," and "c," by noting the frequency for which the frequency component portion $12_{resistive}$ is the largest, e.g., by noting that $Y_{aC}$ is greater than either $Y_{aB}$ or $Y_{aA}$, or by noting that $Y_{aC}$ is greater than any of the other frequency component portions $12_{resistive}$. Alternative algorithms or selection criteria may be employed consistent with the above without departing from the principles of the invention.

To illustrate one alternative, demodulating the response at a frequency near the resistive portion of the response may provide sufficient information about the resistive portion to reveal the differences described above. For example, it is common practice to demodulate a signal ("ground signal") that is orthogonal to the predominate ground phase. Since there is often less than 10 degrees of difference between this ground signal and the resistive component portion of the response, the ground signal could be used as a surrogate for the resistive portion of the response.

To illustrate another alternative, the resistive and reactive component portions of the response could be added and the sum used for the comparison described above, where the contribution to the sum provided by the reactive component portions of the response do not materially or substantially affect the comparison. As will now be readily appreciated by those of ordinary skill in the art, there are many ways in which a response can be resolved, conditioned, or operated upon to obtain a signal which is sufficiently responsive to changes in the reactive component portion of the response that comparisons of such signals may be used to achieve the advantages of the invention. Accordingly, it should be understood that resolving response signals into resistive components in accord with the invention includes resolving, conditioning, or operating on the response signals in any way such that resistive component portions are present in sufficient degree that differences between the signals for purposes of comparison are governed primarily by differences in the resistive component portions.

Figure 3:
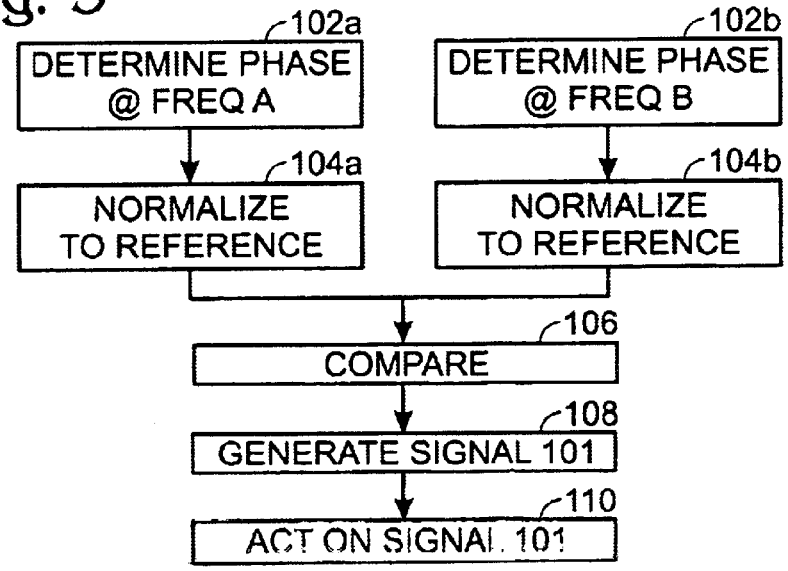
FIG. 3 is a flow chart illustrating a first correlation mode of a method and apparatus for distinguishing metal objects employing multiple frequency interrogation according to the present invention.

In a correlating aspect, the invention may provide for normalizing response data obtained by interrogating the target at at least two frequencies for purposes of comparing the data. Turning to FIG. 3, a flow chart illustrating a preferred method 100 according to the correlating aspect of the invention is shown. A target is interrogated using electromagnetic signals at two frequencies, i.e., 3 kHz and 15 kHz. A response signal is received by the detector and filtered into two frequency specific components. These frequency specific response components are each indicative of the type of metal in the target and should theoretically identify the same metal; accordingly, if they do not, there is reason to distrust either or both of the frequency specific response components as accurately providing information about the type of metal in the target.

In the preferred method 100, at steps 102a and 102b, the phase angle of the frequency specific components is determined and employed as the basis for indicating the type of metal in the target. Alternative methods for employing the information provided by the frequency specific response components to estimate the physical properties of the target, some of which are mentioned below, may be employed without departing from the principles of the invention.

According to the invention, it is desired to compare the phase angles and thereby determine whether the responses for the two frequencies agree. However, a phase angle φ corresponding to a given metal is a function of frequency ω. Therefore, to compare two phase angles associated with two different frequencies requires accounting for how the difference in frequency affects the phase angle. Particularly, in order to compare the phase angles determined in steps 102, the phase angles must first be "normalized" to permit comparison at step 106.

In that regard, to a first approximation:

$$\phi \propto \tan^{-1}(\omega \cdot L/R),$$

where L is the inductance and R is the resistance of the metal as seen by the detector. "R" is also frequency dependent as discussed in Shoemaker, U.S. Pat. No. 5,642,050, and equations are given there for more accurately describing the frequency dependence of φ (see Columns 13–15, equations 23–37, incorporated by reference herein). However, for many purposes, a phase angle at a first frequency can be "converted" to a corresponding phase angle at a second frequency by solving the above equation for L/R at the first frequency and using this result to solve for φ at the second frequency. As an alternative to converting phase angles analytically, the phase angles can be converted by consulting experimental data, preferably, in conjunction with linear interpolation between data points.

In order to provide a reference for the aforementioned normalization, a reference means is provided as described below. As previously indicated, metal detectors characterize or identify metal objects by comparing the responses 10 with predetermined information relating known objects and previously measured responses. The predetermined information is typically provided in the form of a "look-up table" as that term is known in the electrical arts, which is typically embodied in read-only memory, but which can be provided in memory which can be rewritten or modified. The structure, content, and methods of use of the look-up table are well known in the art and detailed discussion is omitted as not being particularly pertinent to the claimed invention. It suffices to explain that the look-up table provides an index or cross-reference between metal objects of varying size and constitution, on the one hand, and the vector response for the relevant interrogation frequencies, which may be expressed in terms of magnitude and phase or resistive and reactive components, on the other. A target is characterized by use of an actual measured response signal by consulting the look-up table and determining which of the targets referenced therein has a corresponding reference response that "best fits" the measured response.

Commonly, metal objects are simply identified by the phase angle at the particular frequency of interrogation. In that case, a "best fit" analysis for particular phase angle data would be to find the metal in the look-up table for which the phase angle characteristic of that metal is closest to the measured phase angle. However, a more detailed "best fit" analysis may be performed by using additional data or computation as desired. The aforementioned reference means may include a look-up table, or an algorithm, or a combination of the two, which correlates a set of selected targets with the phase angles associated with those targets at a reference frequency.

The reference frequency of the reference means may be one of the interrogating frequencies, or it may be some other frequency. For example, in a dual frequency detector employing interrogating frequencies of 3 kHz and 15 kHz, the reference frequency may be selected to be either 3 kHz, 15 kHz, or any other frequency, such as 6.6 kHz. An advantage of employing a third frequency would arise if data were available at the third frequency but not at either of the other two frequencies. An advantage of choosing a third frequency that is between the two interrogating frequencies is that there may be less bias in the normalized results.

To normalize data at frequencies other than the reference frequency, the data are converted to the reference frequency at steps 104a, 104b, permitting direct comparison therebetween at step 106. Where the reference frequency is one of the interrogating frequencies, one of the steps 104a, 104b may be omitted.

A signal 101 is then generated at step 108 that is responsive to the comparison at step 106. For example, if the comparison is a subtraction, the signal may be selected to be proportional to the magnitude of the difference between the normalized data. Other forms of comparison as well as other mathematical relationships between the signal and the results of the comparison may be employed depending on how the signal is to be used.

If the normalized data agree, the data can be presumed (without more) to be accurate. On the other hand, if the normalized data do not agree, there is uncertainty as to the identification of the object. In a dual frequency detector, it may not be possible to assess which data may be more accurate, however additional frequencies may be used in a multi-voting or tie-breaking scheme to provide a basis for favoring data at one frequency to data at another.

Preferably, at least in a dual frequency detector, the signal 101 is employed, at a step 110, to take an action based on the signal 101. In a preferred embodiment of the invention, the signal 101 is used to modulate an output of the detector that indicates the magnitude or strength of the detector's response to a metal object; for example, the signal may be subtracted from the output. However, the signal may be used to indicate or assess disagreement between the normalized data in a number of alternative ways.

Figure 4A:
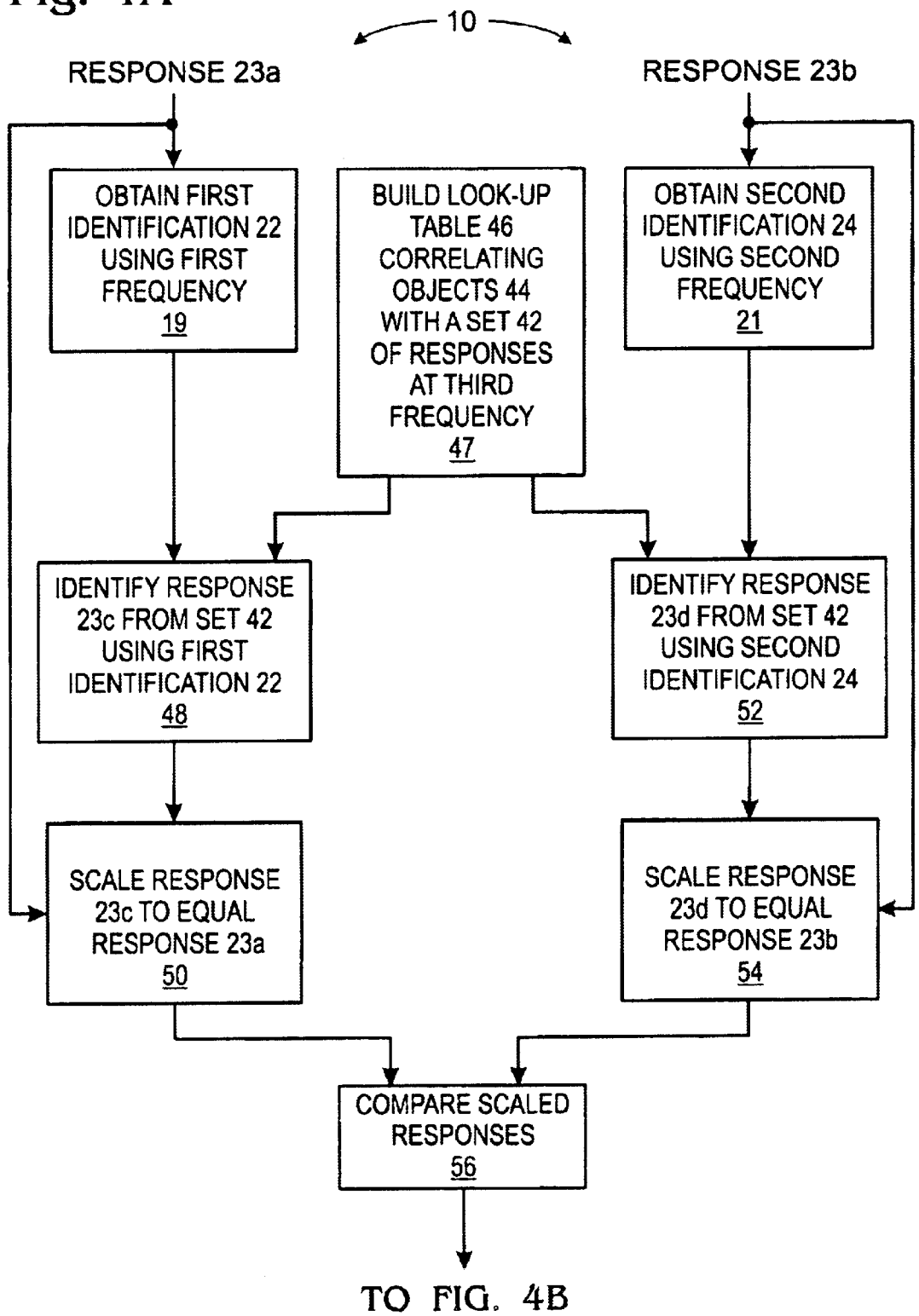
FIG. 4 is a flow chart illustrating a second correlation mode of a method and apparatus for distinguishing metal objects employing multiple frequency interrogation according to the present invention.
Figure 4B:
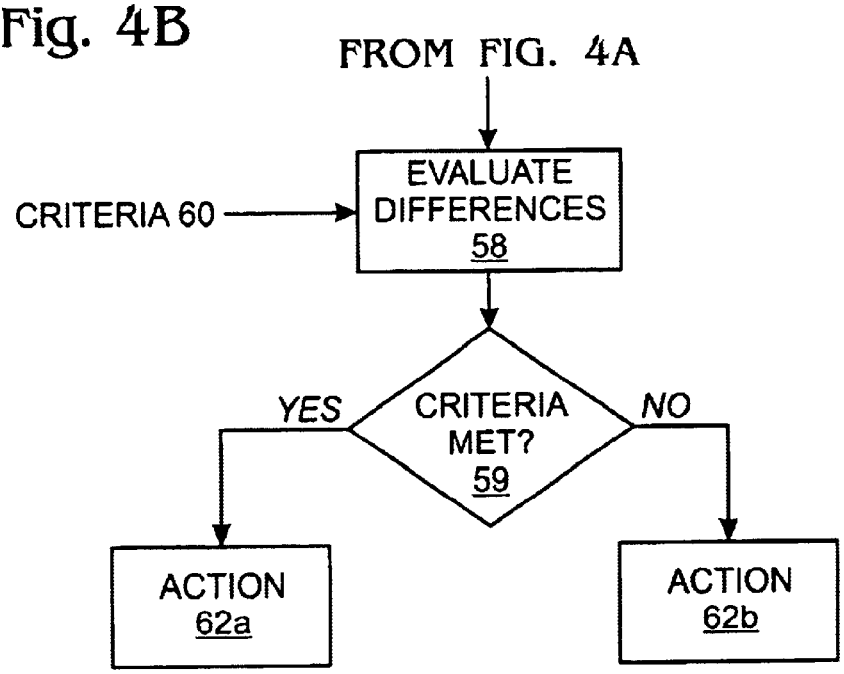

As suggested, normalization may be accomplished in any manner permitting a comparison. For example, it may be performed after data are used to identify a type of metal in the target. Turning to FIG. 4 illustrating this example, a first identification 22 of the object is made using the frequency specific component, referred to as response 23a, corresponding to a first interrogation frequency in a step 19, and a second identification 24 of the same object is made using the frequency specific component, referred to as response 23b, corresponding to a second interrogation frequency in a step 21. The two identifications are compared, at step 26, and any differences evaluated, in step 28, against one or more predetermined criteria 30. In step 29, the detector determines whether the criteria 30 are met as a result of the evaluation in step 28, to obtain the "best fit."

Figure 5:
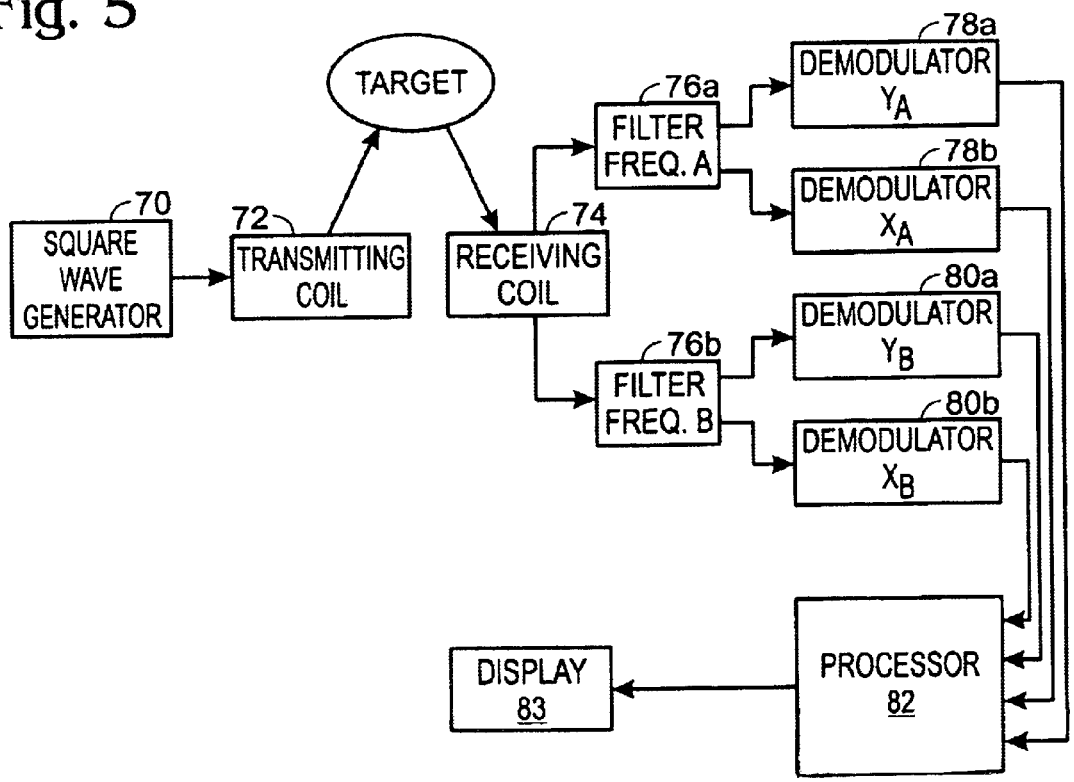
FIG. 5 is a block diagram of a metal detector according to the present invention.

Most simply and preferably, the one or more criteria 30 requires that the two identifications agree on the type of metal, such as the object is formed substantially of gold or silver. The criteria 30 may be any desired criteria, however, and may be either more specific or more general. An example of more specific criteria is that the identifications must also agree on the type of object, such as that the object is a coin. An example of more general criteria is that the identifications need only agree as to whether the object is present or not.

Where the one or more criteria is met, the detector may take one action (step 32a), such as displaying, on a display device 83 FIG. 5 both identifications or choosing one based on some additional criteria. On the other hand, if the one or more criteria is not met, the detector may take a different step (step 32b), e.g., both responses may be discarded, the user may be shown both identifications and be left to draw his or her own conclusions, or the detector may be adapted to characterize the amount of disagreement and either annotate one or both identifications with an estimate of confidence or robustness, or propose a compromise identification. In a detector employing more than two frequencies, a multi-voting or tie-breaking scheme may be employed.

The one or more criteria 30 may also be provided in the form of a tolerance on the comparison. For example, where the phase angles at two frequencies are compared by subtracting one from the other, the critiera 30 may be a number of allowable degrees of difference.

Further, the detector may take one action where the one or more criteria is met and another where the one or more criteria is not met. For example, where the signal is subtracted from the aforedescribed audio output, the result may be compared to a threshold below which the audio signal is entirely suppressed.

While the preferred embodiment and best mode of the invention employs at least two interrogating frequencies and compares the results obtained with each frequency, single or multiple frequency detectors may make use of the aforementioned normalization procedure in accord with the invention. For example, reference data may be available at one frequency and not another frequency that is used for interrogation to obtain measurement data. The reference data may be converted to the interrogating frequency at any time before, during or after acquisition of the measurement data; conversely, the measurement data may be converted to the reference frequency at any time during or after acquisition thereof.

Preferred embodiments of the invention have been described above in functional terms for clarity of presentation, since appropriate means for implementing the functions described will be immediately apparent to those having ordinary skill in the art. However, some implementation issues may be noted. As mentioned, the detector interrogates by transmitting an electromagnetic signal or wave to the target volume of ground, and evaluates the target's response to this interrogation. The different interrogating signals may be generated and received as single frequencies, or they may be parts of a Fourier spectrum of frequencies. Separately provided single frequency signals may be transmitted together, i.e., be transmitted substantially simultaneously, or they may be transmitted at different times during which the metal detecting environment does not substantially change, such as by movement of the detector. Referring to FIG. 5, however, a Fourier spectrum is preferably transmitted for interrogating the target wherein response signals at particular frequencies of interest are obtained by filtering.

Particularly, a square wave generator 70 applies a square wave interrogating signal to a radiating or transmitting coil 72 which acts as an antenna for broadcasting the interrogating signal to the target. The interrogating signal includes a Fourier sum or spectrum of frequencies starting at the base frequency, preferably about 3 kHz, and increasing in integer multiples of the base frequency.

The target receives electromagnetic energy in the transmitted interrogating signal and absorbs some of the energy and re-radiates some of the energy. The re-radiated energy is picked up by a receiving coil 74, which may be the same as the transmitting coil 72, and provided as a total response signal to filters 76a, 76b which resolve the total response signal into two frequency specific components, designated "Freq A" and "Freq B." Additional frequencies may be employed. In a preferred dual frequency embodiment of the invention, the frequency of "Freq A" is the base frequency of about 3 kHz, and the frequency of "Freq B" is about 15 kHz, i.e., the fifth harmonic of the Fourier sum.

The output of the filter 76a is provided to two synchronous demodulators 78a, 78b which, respectively, resolve the frequency specific response component "Freq A" into a resistive portion "$Y_A$" and a reactive portion "$X_A$" according to standard practice. Similarly, the output of the filter 76b is provided to two synchronous demodulators 80a, 80b which, respectively, resolve the frequency specific response component "Freq B" into a resistive portion "$Y_B$" and a reactive portion "$X_B$." As is understood by persons of ordinary skill, the resistive and reactive component portions need not and typically do not align precisely with axes of zero and 90 degrees of phase shift.

Transmitting the interrogating signals together as part of a square wave or other Fourier sum provides a number of advantages, including simplifying the "front end" of the detector, ensuring a fixed phase relationship between the interrogating signals, and ensuring that the demodulators are synchronized with the interrogating signals.

While metal detectors have traditionally employed much analog circuitry, the functions of comparing the differences in magnitude of component portions, selecting a frequency based on the result of such determination, and characterizing the target by consulting a look-up table are preferably carried out by an appropriately programmed microprocessor 82. As will be readily appreciated, however, any of the aforedescribed functions may be implemented with dedicated digital or analog circuitry as desired.

It is to be recognized that, while a particular method and apparatus for distinguishing metal objects employing multiple frequency interrogation has been shown and described as preferred, other configurations and methods could be utilized, in addition to those already mentioned, without departing from the principles of the invention.

The terms and expressions which have been employed in the foregoing specification are used therein as terms of description and not of limitation, and there is no intention in the use of such terms and expressions to exclude equivalents of the features shown and described or portions thereof, it being recognized that the scope of the invention is defined and limited only by the claims which follow.

What is claimed is:

1. A method for distinguishing between metal objects, comprising the steps of:

interrogating a target with at least two frequencies;

receiving respective electrical response signals from said target for at least said two frequencies;

resolving said response signals into respective portions that are at least primarily resistive;

comparing the magnitudes of at least two of said portions;

selecting one response signal from among said response signals based on the results of said step of comparing; and characterizing said target by use of said one response signal.

2. The method of claim 1, wherein said step of selecting selects said one response signal based on whether the respective said portion of said one response signal is larger in magnitude than the respective said portion of another of said response signals.

3. The method of claim 1, wherein said step of selecting selects said one response signal based on whether the respective said portion of said one response signal is larger in magnitude than the respective said portion of all other of said response signals.

4. An apparatus for distinguishing between metal objects, comprising:

an interrogating circuit adapted to interrogate a target with at least two frequencies;

a receiving circuit adapted to receive respective electrical response signals from said target for at least said two frequencies;

a demodulating circuit for resolving said response signals into respective portions that are at least primarily resistive;

a comparing circuit for comparing the magnitudes of said portions; and a selecting circuit for selecting one response signal from among said response signals based on said comparison.

5. The apparatus of claim 4, further comprising a look-up table for characterizing said target with said one response signal.

6. The apparatus of claim 4, wherein said demodulator circuit includes at least two synchronous demodulators associated respectively with said first and second frequencies.

7. The apparatus of claim 6, wherein said demodulator circuit includes at least four synchronous demodulators associated respectively with the resistive and reactive components for each of said first and second frequencies.

8. A method for distinguishing between metal objects, comprising the steps of:

interrogating an actual target with one or more electromagnetic signals at at least first and second frequencies;

receiving respective first and second electrical response signals from said target associated with said first and second frequencies;

obtaining first data from said first electrical response signal data;

normalizing said first data with respect to predetermined reference data at a third frequency; and comparing the normalized said data corresponding to said first response signal to data corresponding to said second response signal; and providing a signal responsive to the results of said step of comparing.

9. The method of claim 8, wherein said third frequency is equal to said second frequency.

10. The method of claim 8, wherein said third frequency is not equal to said second frequency, the method further comprising normalizing the said data corresponding to said second response signal with respect to said predetermined reference data, and wherein said step of comparing includes comparing the normalized said data corresponding to said first response signal to the normalized said data corresponding to said second response signal.

11. The method of claim 8, further comprising providing an output audio representative of the magnitude of at least one of said first and second response signals, and decreasing said audio output as a function of said signal.

* * * * *